(12) United States Patent
Reid et al.

(10) Patent No.: US 7,086,508 B2
(45) Date of Patent: Aug. 8, 2006

(54) END SPLICE ASSEMBLY FOR BOX-BEAM GUARDRAIL AND TERMINAL SYSTEMS

(76) Inventors: John D. Reid, 6307 Yellowstone Cir., Lincoln, NE (US) 68510; John R. Rohde, 2221 Sheridan Blvd., Lincoln, NE (US) 68502; Dean L. Sicking, 5401 Cornell Rd., Lincoln, NE (US) 68516; King K. Mak, 9 Cotswold, San Antonio, TX (US) 78257

( * ) Notice: Subject to any disclaimer, the term of this patent is extended or adjusted under 35 U.S.C. 154(b) by 104 days.

(21) Appl. No.: 10/933,137

(22) Filed: Sep. 2, 2004

(65) Prior Publication Data

US 2005/0034945 A1 Feb. 17, 2005

Related U.S. Application Data

(63) Continuation-in-part of application No. 10/262,366, filed on Oct. 1, 2002, which is a continuation-in-part of application No. 09/935,949, filed on Aug. 23, 2001, now Pat. No. 6,457,570, which is a continuation-in-part of application No. 09/307,235, filed on May 7, 1999, now Pat. No. 6,308,809.

(51) Int. Cl.
*F16F 7/12* (2006.01)

(52) U.S. Cl. ........................................ 188/377; 188/371

(58) Field of Classification Search ................ 188/371, 188/372, 374, 376, 377; 280/407.1; 256/13.1; 293/133; 74/492
See application file for complete search history.

(56) References Cited

U.S. PATENT DOCUMENTS

| 4,200,310 | A | * | 4/1980 | Carney, III | 280/784 |
| 5,181,589 | A | * | 1/1993 | Siegner et al. | 188/374 |
| 5,947,452 | A | * | 9/1999 | Albritton | 256/13.1 |
| 6,308,809 | B1 | * | 10/2001 | Reid et al. | 188/377 |
| 6,457,570 | B1 | * | 10/2002 | Reid et al. | 188/377 |
| 6,668,989 | B1 | * | 12/2003 | Reid et al. | 188/377 |

* cited by examiner

*Primary Examiner*—Christopher P. Schwartz
(74) *Attorney, Agent, or Firm*—Jackson Walker, LP

(57) ABSTRACT

An end splice assembly for a box-beam guardrail and terminal system having a first stage rail element and a second stage rail element. The assembly has two major connecting components. Upper and lower bent plate channels and upper and lower channel splice plates. The channels and plates have side walls which extend laterally to one another when the two rail elements are mated. The channels and plates are fastened together to provide moment strength to the splice within the system.

2 Claims, 2 Drawing Sheets

END SPLICE ASSEMBLY FOR BOX-BEAM GUARDRAIL AND TERMINAL SYSTEMS

This is a continuation-in-part application based upon U.S. patent application Ser. No. 10/262,366, filed Oct. 1, 2002, which is a continuation-in-part of Ser. No. 09/935,949 filed Aug. 23, 2001, now U.S. Pat. No. 6,457,570, issued Oct. 1, 2002, which was a continuation-in-part of Ser. No. 09/307,235 filed May 7, 1999 now U.S. Pat. No. 6,308,809, issued Oct. 30, 2001.

BACKGROUND OF THE INVENTION

This invention relates to traffic crash attenuation and cushion systems. More particularly, the present invention relates to box-beam guardrails and terminals. Even more specifically, the present invention relates to an improved splice mechanism for connecting two stages of a box-beam bursting energy absorbing terminal, sometimes referred to as a BEAT application. A full discussion of this bursting energy absorption technology is found in U.S. Pat. Nos. 6,457,570 and 6,308,809, which are incorporated herein by reference for all purposes. It should be understood that the present invention may be used with any box-beam barrier system or terminal.

Presently, the standard splice mechanism (FIG. 1) for a box-beam guardrail system consists of two plates (A and B) bolted to the inside of the bottom and top of the separate box-beam rails (C and D). FIG. 1 illustrates such prior art splice mechanism. This splice design is not suitable for use with BEAT applications. In order for the bursting process to continue through a splice, it is necessary to shear off the splice bolts and release the splice plates in advance of the mandrel. The energy and the associated force level required to shear off all eight splice bolts E simultaneously is too high for this design to be a viable alternative.

FIG. 2 illustrates an early design of a splice mechanism for use with BEAT applications. The splice mechanism consists of two angles F and F' welded 50 mm (2 in.) from the downstream end G of the upstream tube H, one on top F and one on the bottom F'. The angles are 63.5×63.5×6.4 mm (2.5×2.5×¼ in.) in dimension and reinforced with gusset plates. Two special splice plates J and J' were used to connect the upstream tube H and the downstream tube K. The splice plates are fabricated from 13 mm (½ in.) A36 steel plates and welded together to form a L-shape and reinforced with gusset plates. The overall dimensions of the splice plates are 406 mm (16 in.) long, 102 mm (4 in.) wide, and 63.5 mm (2.5 in.) high. The longer legs L and L' of the splice plates are bolted to the upstream end M of the downstream tube K with two 16-mm (⅝-in.) diameter grade 5 bolts each, again one on top and one on the bottom. The shorter legs N and N' of the splice plates on the upstream end are then bolted to the angles on the upstream tube, also with 16-mm (⅝-in.) diameter grade 5 bolts.

This initial splice mechanism requires the mandrel to shear off only two bolts at one time, thus greatly reducing the energy and associated force level. Also, the splice plates are outside of the tubes and do not interfere with the mandrel. However, the moment capacity of this splice mechanism is limited by the bolts connecting the splice plates to the angles, rendering the BEAT terminal design somewhat sensitive to redirectional type of impacts.

The present invention maintains the advantages of the early design, but provides a greater moment capacity of the splice and improving the performance of the barrier or crash system for redirectional types of impacts.

DETAILED DESCRIPTION OF THE PREFERRED EMBODIMENT

Figure 1:
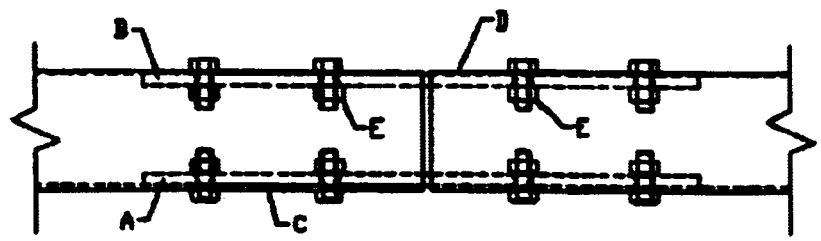
FIG. 1 illustrates a standard prior art splice mechanism for box-beam guardrails and terminal system.
Figure 2:
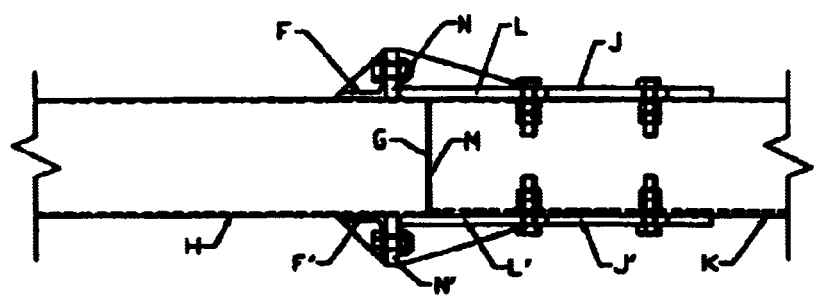
FIG. 2 shows an improved splice mechanism for use in BEAT applications.
Figure 3A:
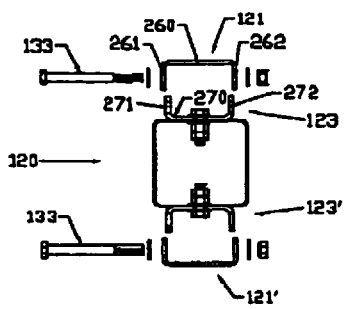
FIG. 3A is an exploded end elevation view of the partially assembled splice mechanism of the present invention for connecting a stage one to a stage two box-beam energy-absorber.
Figure 3B:
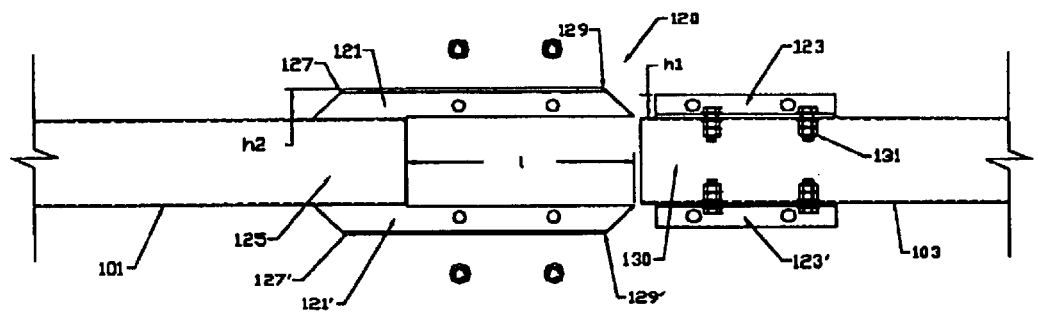
FIG. 3B is an exploded side elevation view of the splice mechanism of FIG. 3A.
Figure 3C:
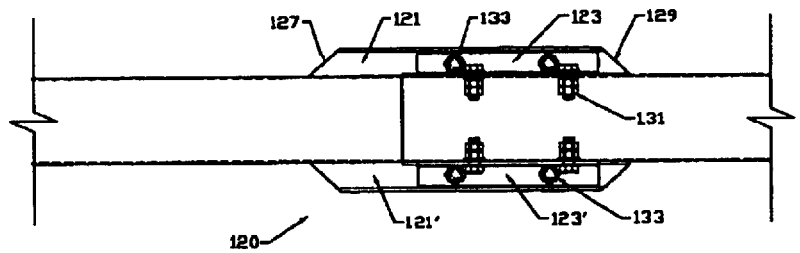
FIG. 3C is a side elevation view of the splice mechanism in its assembled form.

As previously stated above, FIGS. 1 and 2 illustrate current splice mechanisms. FIGS. 3A–3C show the present invention. The mechanism 120 consists of two major components: a) two bent plate channels 121 and 121' welded to the downstream end 125 of an upstream rail element 101, and b) two channel splice plates 123 and 123' bolted to the upstream end 126 of the downstream rail element 103.

The bent plate channels 121 and 121' are 464-mm (18¼-in.) long and 121 mm (4¾ in.) wide, fabricated from 6 mm (¼ in.) thick plates. The height of the channels increases from 48 mm (1⅞ in.) $h_1$ on the downstream (free) end to 51 mm (2 in.) $h_2$ on the upstream (welded) end to provide more clearance for the channel splice plates to slide into place. The channels are welded to the top and bottom of the downstream end 125 of the upstream tube 101 for a length $L_1$ of 152 mm (6 in.). The ends 127, 127', 129 and 129' of the channels are tapered to minimize the potential for snagging by the vehicle.

The channel splice plates 123 and 123' are 267 mm (10½ in.) long and fabricated from C102 mm×38 mm×7.9 mm (4 in.×1½ in.×⁵⁄₁₆ in.) channels. The channel bolted to the top and bottom of the upstream end 130 of the downstream (second) rail element 103 with two 16-mm (⅝-in.) diameter grade 5 bolts 131 each. The two rail elements 101 and 103 are then mated together by sliding the ends of the rail elements together and bolting the channel splice plates to the bent plate channel with 19-mm (¾-in.) diameter grade 5 bolts 133.

As may be seen in FIG. 3D, it should be noted that each bent plate channel 121 or 121' has an upper wall 260 and two spaced apart perpendicularly depending side walls 261 and 262. Each channel splice plate 123 or 123' has a bottom wall 270 and two spaced apart perpendicularly extending side walls 271 and 272. Where the two rail elements 101 and 103 are mated by sliding the second element the length into and between the bent channel plates, the downstream end 125 may abut with upstream end 130, the side walls 271 and 272 of the channel splice plates extend laterally inside and adjacent the side walls 261 and 262 of the bent plate channels. This provides lateral contacting support surfaces which prevent twisting of the splice and add splice strength for redirectional type impacts to the overall system.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. An end splice assembly for a box-beam guardrail and terminal system having a first stage energy absorption rail element and a second stage energy absorption rail element comprising:

a first bent plate channel attached to a first side of a downstream end of said first stage element and extending a length beyond said downstream end of said first element, said first bent plate channel having an upper wall and two spaced apart perpendicularly depending side walls;

a second bent plate channel attached to a second, opposite, side of said downstream end of said first stage element and extending said length beyond said downstream end of said first stage element, said second bent plate channel having an upper wall and two spaced apart perpendicularly depending side walls;

a first channel splice plate attached to a first side of an upstream end of said second stage element, said first channel splice plate having a bottom wall and two spaced apart perpendicularly depending side walls;

a second channel splice plate attached to a second, opposite, side of said upstream end of said second stage element, said second channel splice plate having a bottom wall and two spaced apart perpendicularly depending side walls;

said first and second channel splice plate perpendicularly extending side walls adopted to be received between said spaced apart perpendicularly depending side walls of said first and second bent plate channels when said first stage element and said second stage element are abutted at said upstream and downstream ends; and fastener members to attach said first bent plate channel to said first channel splice plate and to attach said second bent plate channel to said second channel splice plate when said channel splice plates are received between said bent plate channels.

2. An end splice assembly for a box-beam guardrail and terminal system having a first energy absorption rail element and a second energy absorption rail element comprising:

a first bent plate channel attached to a first side of a downstream end of said first element and extending a length beyond said downstream end of said first element, said first bent plate channel having an upper wall and two spaced apart perpendicularly depending side walls;

a second bent plate channel attached to a second, opposite, side of said downstream end of said first element and extending said length beyond said downstream end of said first element, said second bent plate channel having an upper wall and two spaced apart perpendicularly depending side walls;

a first channel splice plate attached to a first side of an upstream end of said second element, said first channel splice plate having a bottom wall and two spaced apart perpendicularly depending side walls;

a second channel splice plate attached to a second, opposite, side of said upstream end of said second element, said second channel splice plate having a bottom wall and two spaced apart perpendicularly depending side walls;

said first and second channel splice plate perpendicularly extending side walls adopted to be received between said spaced apart perpendicularly depending side walls of said first and second bent plate channels when said first element and said second element are abutted at said upstream and downstream ends; and fastener members to attach said first bent plate channel to said first channel splice plate and to attach said second bent plate channel to said second channel splice plate when said channel splice plates are received between said bent plate channels.

* * * * *